United States Patent Office 3,399,988
Patented Sept. 3, 1968

3,399,988
METHOD OF CONTROLLING THE
GROWTH OF WEEDS
Stassen Y. C. Soong, Taipei, Taiwan, China, Byron H. Lake, Greenville, Miss., and Don R. Baker, Pinole, Calif., assignors to Stauffer Chemical Company, New York, N.Y., a corporation of Delaware
No Drawing. Continuation-in-part of application Ser. No. 308,661, Sept. 13, 1963. This application July 15, 1966, Ser. No. 565,418
8 Claims. (Cl. 71—94)

ABSTRACT OF THE DISCLOSURE

N-alkyl sulfonyl glycolamides useful as effective herbicides corresponding to the formula

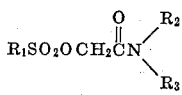

in which $R_1$ is selected from the group consisting of alkyl, alkenyl, haloalkyl, haloalkenyl, haloalkenyl thiophene, phenylalkyl, naphthyl, phenyl, and substituted phenyl wherein the substituents are selected from the group consisting of halogen, alkyl and nitro; and $R_2$ and $R_3$ are independently selected from the group consisting of hydrogen, alkyl, alkenyl, cyclic alkyl, cyclic alkenyl, phenyl, phenylalkyl, furfuryl, alkoxyalkyl and cyclic alkyl ethers. Representative compounds are O-benzenesulfonyl-N-isopropyl glycolamide, O-methanesulfonyl-N-n-butyl glycolamide, O-p-bromobenzenesulfonyl-N-n-butyl glycolamide, O-methanesulfonyl-N,N-diallyl glycolamide, O-i-butylsulfonyl-N,N-diallyl glycolamide, O-i-butylsulfonyl-N,N-(2-ethylpentamethylene) glycolamide, O-i-butylsulfonyl N -sec-butyl glycolamide.

This application is a continuation-in-part of application Ser. No. 308,661, filed Sept. 13, 1963, now abandoned.

This invention relates to certain new and novel compositions of matter and their use as herbicides. More particularly, the present invention relates to novel compounds of the structure

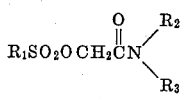

wherein $R_1$ is a radical selected from the class consisting of alkyl, alkenyl, haloalkyl, haloalkenyl, phenyl, substituted phenyl wherein the substituents are selected from the group consisting of halogen, alkyl and nitro; thiophene, phenylalkyl and naphthyl, and $R_2$ and $R_3$ are selected from the groups consisting of hydrogen, alkyl, alkenyl, cyclic alkyl, cyclic alkenyl, phenyl, phenylalkyl, furfuryl, alkoxyalkyl and cyclic alkyl ethers. By cyclic alkyl is meant a radical such as cyclohexyl which may be attached at the $R_2$ and/or $R_3$ position and, in addition, radicals such as hexamethylene which would attach at $R_2$ and $R_3$ to form a ring utilizing the N atom as a ring member. Cyclic alkyl ethers is meant to convey an alkyl ether in which the alkyl portions of the ether are attached to the N atom at the $R_2$ and $R_3$ positions so as to form a ring structure with the N atom.

The preferred compounds of the instant invention include compounds wherein $R_1$ is an alkyl having one to twelve carbon atoms, lower alkenyl, haloalkyl having one to twelve carbon atoms, haloloweralkenyl, alkyl substituted phenyls wherein the alkyl contains up to twelve carbon atoms, phenyl lower alkyl, or loweralkoxyalkyls; $R_2$ is hydrogen, alkyl having up to 8 carbon atoms, or lower alkenyl; and $R_3$ is hydrogen, alkyl having up to 8 carbon atoms, or lower alkenyl. In the foregoing the term "lower" is meant to imply alkyls or alkenyls containing up to and including 5 carbon atoms.

These new and novel compounds of the present invention may be made by reacting the appropriately substituted glycolamide and the appropriate sulfonyl chloride in the presence of an organic base such as triethylamine.

Typical examples of the method of synthesis are as follows:

Example 1.—O-benzenesulfonyl-N-isopropyl glycolamide

To the benzene (100 ml.) solution of N-isopropyl glycolamide (11.7 g., 0.10 mole) and benzenesulfonyl chloride (12.7 ml., 0.10 mole) was added 15.2 ml. of triethylamine at 15–20° C. over a period of five minutes with stirring. The mixture was allowed to stir for one hour at 20–32°C. The mixture was washed with water (100 ml.), dilute hydrochloric acid (100 ml.) and water and then dried over magnesium sulfate and evaporated in vacuo to yield 22 g. of a light yellow liquid. On standing the liquid crystallized. This was recrystallized using n-butyl ether, washed with n-butyl ether and cyclohexane to yield 13.5 g. of crystals. M.P. 64–66°C.

Example 2.—O-methanesulfonyl-N-n-butyl glycolamide

To the benzene (100 ml.) solution of N-n-butyl glycolamide (13.1 g., 0.10 mole) and methanesulfonyl chloride (7.7 ml., 0.10 mole) was added triethylamine (14 ml., 0.10 mole) at 16–23° C. over a period of twenty minutes with stirring and cooling. It was then stirred at 20–27° C. for one hour. The mixture was washed with water (100 ml.), dilute hydrochloric acid (100 ml.) and water (100 ml.) and dried over magnesium sulfate. Evaporation in vacuo yielded 17 g. of an oil which on scratching formed crystals. This was recrystallized from cyclohexane:ether and washed with 50:50 ether-carbon tetrachloride to yield 8 g. of a first fraction (M.P. 54–56° C.) and 1 g. of a second fraction (M.P. 52–53° C.).

Analysis—Found: Sulfur 15.5%. Calc.: Sulfur 15.4%.

Example 3.—O-p-bromobenzenesulfonyl-N-n-butyl glycolimide

To the benzene (100 ml.) solution of N-n-butyl glycolamide (6.5 g., 0.05 mole) and p-bromobenzenesulfonyl chloride (12.8 g., 0.05 mole) was added the triethylamine (7 ml., 0.05 mole) in one portion at 13° C. The temperature was kept at 13–20° C. with stirring and cooling until the exothermicity had ceased and then at 20–25° C. for 1½ hours.

The mixture was washed with water (100 ml.), dilute hydrochloric acid (100 ml.) and water. It was then dried over magnesium sulfate and evaporated in vacuo to yield a light yellow oil that soon crystallized to yield a crystalline mass. This was recrystallized from 75 ml. of n-butyl ether to yield 13 g. of product. M.P. 76–77° C.

Analysis.—Found: Bromine 22.5%, sulfur 8.98%. Calc.: Bromine 22.8%, sulfur 9.15%.

Example 4.—O-methanesulfonyl-N,N-di-n-propyl glycolamide

To the ether (100 ml.) solution of the N,N-di-n-propyl glycolamide (15.9 g., 0.10 mole), methane sulfonyl chloride (7.7 ml., 0.10 mole) was added triethylamine (14 ml., 0.10 mole) at 15–18° C. over a period of 45 minutes with stirring and cooling. The mixture was stirred for forty minutes and then washed with water (50 ml.), dilute hydrochloric acid (50 ml.) and water (50 ml.). The ether solution was dried over magnesium sulfate and evaporated in vacuo at 80° C. (20 mm.) to yield 19.5 g. of a light yellow oil. Cooling with Dry Ice induced crystals. The crystals were washed with n-butyl ether and cyclohexane to yield 13 g. of crystals. M.P. 35–37° C.

*Analysis.*—Found: Sulfur 13.5%. Calc: Sulfur 13.5%.

These novel compounds of the present invention have also been found to possess valuable herbicidal properties. This herbicidal activity of the compounds of the present invention was demonstrated by the following test.

Seven weed species were indiscriminately selected for testing each compound from the group consisting of crabgrass, water grass, foxtail, wild oats, lamb's-quarter, redrott pigweed, Jimsonweed, field bindweed, red oats, mustard, annual bluegrass, dock and Indian mustard. Seeds of the seven slected weed species are planted in individual rows one-half inch deep in Santa Cruz sandy loam soil contained in compressed paper flats 8¼" by 6½" which are 2¾" deep. Enough weed seeds are planted to give about thirty to fifty plants of each of the selected weed species in each flat. The flats are watered after planting and the following day each flat is sprayed at a rate of 20 lbs. of the compound under test in 80 gallons of solution per acre. A No. 152 De Vilbiss atomizer is used to spray the solution on the soil surface. Two weeks later the degree of weed control is determined by comparing the amount of germination and growth of each weed in the treated flats with the weeds in several untreated control flats. In reporting the results, the herbicidal effect of each compound with respect to each weed species was checked separately and rated from 0 to 3 (0—no control, 1—partial controls, 2—good control, 3—complete control). The sum of these rating based on the seven weed species employed is then called the activity index (A.I.) and is indicated in the following table.

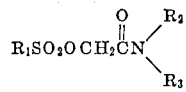

$$R_1SO_2OCH_2\overset{O}{\overset{\|}{C}}N\begin{smallmatrix}R_2\\R_3\end{smallmatrix}$$

| Compound | R₁ | R₂ | R₃ | Activity Index |
|---|---|---|---|---|
| 1 | p-Methylphenyl | Hydrogen | i-Propyl | 20 |
| 2 | Phenyl | do | n-Butyl | 20 |
| 3 | do | do | i-Propyl | 20 |
| 4 | Methyl | do | n-Butyl | 18 |
| 5 | p-Bromophenyl | do | do | 15 |
| 6 | Methyl | do | i-Butyl | 16 |
| 7 | Phenyl | Ethyl | Ethyl | 21 |
| 8 | Methyl | do | do | 21 |
| 9 | p-Bromophenyl | do | do | 17 |
| 10 | 3,4-dichlorophenyl | Hydrogen | i-Propyl | 11 |
| 11 | Ethyl | do | n-Butyl | 11 |
| 12 | Methyl | Allyl | Allyl | 20 |
| 13 | 3,4-dichlorophenyl | do | do | 18 |
| 14 | do | Hydrogen | n-Propyl | 16 |
| 15 | Methyl | n-Propyl | do | 21 |
| 16 | p-Chlorophenyl | do | do | 17 |
| 17 | p-Bromophenyl | n-Butyl | n-Butyl | 9 |
| 18 | Methyl | Hexamethylene | | 18 |
| 19 | p-Chlorophenyl | Hexamethylene | | 15 |
| 20 | Phenyl | Hexamethylene | | 17 |
| 21 | Methyl | 2-methyl-pentamethylene | | 21 |
| 22 | do | Pentamethylene | | 20 |
| 23 | Benzyl | Hexamethylene | | 20 |
| 24 | do | Pentamethylene | | 18 |
| 25 | p-Nitrophenyl | n-Propyl | n-Propyl | 10 |
| 26 | Naphthyl | Allyl | Allyl | 12 |
| 27 | p-Nitrophenyl | Hexamethylene | | 14 |
| 28 | p-Fluorophenyl | Hexamethylene | | 19 |
| 29 | Methyl | i-Butyl | i-Butyl | 6 |
| 30 | p-Methylphenyl | Hexamethylene | | 20 |
| 31 | Methyl | Hydrogen | Cyclohexyl | 17 |
| 32 | p-Chlorophenyl | do | i-Butyl | 18 |
| 33 | p-Nitrophenyl | do | do | 14 |
| 34 | do | do | i-Propyl | 12 |
| 35 | p-Chlorophenyl | do | Cyclohexyl | 9 |
| 36 | p-Nitrophenyl | do | do | 6 |
| 37 | CFCl₂CCl₂— | Hexamethylene | | 16 |
| 38 | Methyl | Methyl | Methy | 12 |
| 39 | do | —3-oxa-pentylmethylene— | | 10 |
| 40 | n-Butyl | Hydrogen | Cyclohexyl | 9 |
| 41 | do | do | isopropoxypropyl | 5 |
| 42 | Phenyl | do | do | 12 |
| 43 | CFCl₂CFCl— | Allyl | Allyl | 5 |
| 44 | Phenyl | Hydrogen | Cyclohexyl | 9 |
| 45 | CH₂=CH— | do | do | 8 |
| 46 | Methyl | Tetramethylene | | 17 |
| 47 | Phenyl | Tetramethylene | | 13 |
| 48 | P-Nitrophenyl | Tetramethylene | | 13 |
| 49 | Ethyl | Hexamethylene | | 15 |
| 50 | do | i-Butyl | i-Butyl | 7 |
| 51 | do | Hydrogen | Cyclohexyl | 13 |
| 52 | n-Butyl | do | 3,4-dichlorophenyl | 5 |
| 53 | Methyl | do | do | 5 |
| 54 | CF₂ClCCl₂— | Hexamethylene | | 14 |
| 55 | m-Nitrophenyl | Hexamethylene | | 13 |
| 56 | p-Fluorophenyl | Pentamethylene | | 9 |
| 57 | 3,4-dichlorophenyl | Hydrogen | Isopropoxy ropyl | 4 |
| 58 | do | Hexamethylene | | 9 |
| 59 | 2-naphtyl | Hexamethylene | | 16 |
| 60 | p-Iodophenyl | Hexamethylene | | 13 |
| 61 | 3,4-dichlorophenyl | Methyl | phenyl | 7 |
| 62 | Methyl | do | do | 20 |
| 63 | p-Bromophenyl | Hexamethylene | | 7 |
| 64 | Methyl | Ethyl | n-Butyl | 19 |
| 65 | Ethyl | do | do | 21 |
| 66 | n-Butyl | do | do | 20 |
| 67 | o-Nitrophenyl | do | do | 14 |
| 68 | p-Fluorophenyl | do | do | 13 |
| 69 | p-Nitrophenyl | do | do | 12 |
| 70 | p-Chlorophenyl | do | do | 13 |
| 71 | n-Butyl | Methyl | Phenyl | 16 |
| 72 | p-Chlorophenyl | do | do | 16 |
| 73 | do | Hydrogen | Isopropoxy-propyl | 11 |
| 74 | Methyl | do | Phenyl | 91 |
| 75 | Ethyl | do | do | 6 |
| 76 | Butyl | do | do | 9 |
| 77 | CHCl=CCl | Hexamethylene | | 9 |
| 78 | CH₂Cl— | Hexamethylene | | 18 |

| Compound | R₁ | R₂ | R₃ | Activity Index |
|---|---|---|---|---|
| 79 | CH₂Cl— | Ethyl | Butyl | 13 |
| 80 | CH₂Cl— | Hydrogen | Cyclohexyl | 7 |
| 81 | Methyl | do | Allyl | 19 |
| 82 | o-Thiophene | | Hexamethylene | 20 |
| 83 | do | Ethyl | Butyl | 16 |
| 84 | Methyl | | 4-methyl-pentamethylene | 21 |
| 85 | Butyl | | 4-methyl-pentamethylene | 20 |
| 86 | Methyl | | 3-methyl-pentamethylene | 20 |
| 87 | Butyl | | 3-methyl-pentamethylene | 17 |
| 88 | CH₂Cl— | | 4-methyl-pentamethylene | 16 |
| 89 | CH₂=CH— | | 4-methyl-pentamethylene | 20 |
| 90 | Phenyl | | 4-methyl-pentamethylene | 13 |
| 91 | p-Toluyl | | 3-methyl-pentamethylene | 12 |
| 92 | Ethyl | | 3-methyl-pentamethylene | 17 |
| 93 | p-Toluyl | | 3-methyl-pentamethylene | 18 |
| 94 | Ethyl | | 4-methyl-pentamethylene | 18 |
| 95 | do | | 3-methyl-pentamethylene | 21 |
| 96 | Methyl | Methyl | Butyl | 20 |
| 97 | Ethyl | do | do | 21 |
| 98 | Butyl | do | do | 20 |
| 99 | Phenyl | do | do | 19 |
| 100 | Ethyl | Hydrogen | Allyl | 21 |
| 101 | Butyl | do | do | 20 |
| 102 | Methyl | do | i-Propyl | 21 |
| 103 | Ethyl | do | do | 21 |
| 104 | Methyl | do | Ethyl | 21 |
| 105 | Ethyl | do | do | 18 |
| 106 | Butyl | do | do | 21 |
| 107 | do | do | i-Propyl | 21 |
| 108 | Phenyl | do | Allyl | 18 |
| 109 | do | do | Ethyl | 15 |
| 110 | Ethyl | | 2-methyl-pentamethylene | 18 |
| 111 | Butyl | | 2-methyl-pentamethylene | 19 |
| 112 | Methyl | Hydrogen | Methyl | 7 |
| 113 | Ethyl | do | do | 13 |
| 114 | Butyl | do | do | 14 |
| 115 | Phenyl | do | do | 15 |
| 116 | Methyl | do | Propyl | 21 |
| 117 | Ethyl | do | do | 20 |
| 118 | Methyl | do | Butyl | 17 |
| 119 | Butyl | do | do | 19 |
| 120 | Phenyl | do | Propyl | 15 |
| 121 | do | do | Butyl | 16 |
| 122 | p-Toluyl | do | do | 18 |
| 123 | do | do | Propyl | 17 |
| 124 | p-Ethylphenyl | | Hexamethylene | 17 |
| 125 | 4-dodecylphenyl | | Hexamethylene | 16 |
| 126 | Phenyl | | 2-methyl-pentamethylene | 16 |
| 127 | p-Toluyl | | 2-methyl-pentamethylene | 18 |
| 128 | Methyl | Ethyl | Cyclohexyl | 21 |
| 129 | Butyl | do | do | 12 |
| 130 | Ethyl | do | do | 18 |
| 131 | Phenyl | do | do | 13 |
| 132 | Methyl | | Δ²pentalene | 15 |
| 133 | Ethyl | | Δ²pentalene | 19 |
| 134 | CH₂Cl— | | Δ²pentalene | 16 |
| 135 | Butyl | | Δ²pentalene | 21 |
| 136 | Methyl | Ethyl | Phenyl | 19 |
| 137 | Ethyl | do | do | 21 |
| 138 | Butyl | do | do | 6 |
| 139 | Phenyl | do | do | 5 |
| 140 | Propyl | | Hexamethylene | 21 |
| 141 | Ethyl | Allyl | Allyl | 21 |
| 142 | Butyl | do | do | 21 |
| 143 | Phenyl | do | do | 14 |
| 144 | p-Toluyl | do | do | 17 |
| 145 | Propyl | Hydrogen | do | 20 |
| 146 | CH₂Cl— | do | do | 21 |
| 147 | Propyl | | 2-methyl-pentamethylene | 21 |
| 148 | do | | 3-methyl-pentamethylene | 21 |
| 149 | Ethyl | | Pentamethylene | 21 |
| 150 | Butyl | | Pentamethylene | 20 |
| 151 | Propyl | | Pentamethylene | 21 |
| 152 | Phenyl | | Pentamethylene | 10 |
| 153 | Methyl | Hydrogen | i-Butyl | 16 |
| 154 | Butyl | do | do | 20 |
| 155 | Propyl | do | do | 21 |
| 156 | Phenyl | do | do | 21 |
| 157 | Methyl | Butyl | Butyl | 17 |
| 158 | Ethyl | do | do | 16 |
| 159 | do | Hydrogen | —CH₂CH₂OCH(CH₃)₂ | 17 |
| 160 | Butyl | do | —CH₂CH₂OCH(CH₃)₂ | 21 |
| 161 | Methyl | do | t-Butyl | 20 |
| 162 | Ethyl | do | do | 21 |
| 163 | Propyl | do | do | 17 |
| 164 | Butyl | do | do | 20 |
| 165 | Phenyl | do | do | 13 |
| 166 | Methyl | do | Furfuryl | 11 |
| 167 | Ethyl | do | do | 15 |
| 168 | Propyl | do | do | 19 |
| 169 | Butyl | do | do | 13 |
| 170 | Phenyl | do | do | 19 |
| 171 | Methyl | do | Benzyl | 6 |
| 172 | Ethyl | do | do | 8 |
| 173 | Propyl | do | do | 16 |
| 174 | Butyl | do | do | 18 |
| 175 | Phenyl | do | do | 14 |
| 176 | Methyl | | 2-ethyl-pentamethylene | 21 |
| 177 | Ethyl | | 2-ethyl-pentamethylene | 21 |
| 178 | Propyl | | 2-ethyl-pentamethylene | 21 |
| 179 | Butyl | | 2-ethyl-pentamethylene | 21 |
| 180 | Methyl | Hydrogen | Sec-butyl | 21 |
| 181 | Ethyl | do | do | 20 |
| 182 | Propyl | do | do | 19 |
| 183 | Butyl | do | do | 18 |
| 184 | Phenyl | do | do | 18 |
| 185 | Ethyl | Ethyl | Ethyl | 18 |
| 186 | Propyl | do | do | 20 |

| Compound | R₁ | R₂ | R₃ | Activity Index |
|---|---|---|---|---|
| 187 | Methyl | | 3,5-dimethyl-4-oxopentamethylene | 18 |
| 188 | Ethyl | | 3,5-dimethyl-4-oxopentamethylene | 18 |
| 189 | Propyl | | 3,5-dimethyl-4-oxopentamethylene | 19 |
| 190 | Butyl | | 3,5-dimethyl-4-oxopentamethylene | 19 |
| 191 | Phenyl | | 3,5-dimethyl-4-oxopentamethylene | 18 |
| 192 | Benzyl | Hydrogen | Allyl | 21 |
| 193 | do | Allyl | do | 21 |
| 194 | do | Hydrogen | Propyl | 21 |
| 195 | do | do | i-Propyl | 21 |
| 196 | do | Phenyl | Ethyl | 12 |
| 197 | do | Hydrogen | i-Butyl | 20 |
| 198 | do | do | Benzyl | 13 |
| 199 | do | | 2-methyl-pentamethylene | 21 |
| 200 | do | | 3-methyl-pentamethylene | 21 |
| 201 | do | | 4-methyl-pentamethylene | 21 |
| 202 | Hexyl | | 2-methyl-pentamethylene | 16 |
| 203 | Octyl | | 2-methyl-pentamethylene | 12 |
| 204 | Hexyl | Hydrogen | i-Propyl | 18 |
| 205 | Octyl | do | do | 12 |
| 206 | Hexyl | do | Sec-butyl | 16 |
| 207 | do | | 4-methyl-pentamethylene | 14 |
| 208 | Octyl | | 4-methyl-pentamethylene | 12 |
| 209 | Hexyl | | Hexamethylene | 19 |
| 210 | do | Allyl | Allyl | 16 |
| 211 | Dodecyl | n-Butyl | Octyl | 13 |
| 212 | 4-dodecylphenyl | Allyl | Allyl | 12 |
| 213 | i-Butyl | Hydrogen | t-Octyl | 14 |
| 214 | do | Allyl | Allyl | 19 |
| 215 | do | n-Propyl | n-Propyl | 17 |
| 216 | do | | Hexamethylene | 18 |
| 217 | do | Hydrogen | Benzyl | 17 |
| 218 | do | | 2-ethyl-pentamethylene | 20 |
| 219 | do | Hydrogen | Cyclohexyl | 18 |
| 220 | do | Methyl | Tetrahydrofurfuryl | 13 |
| 221 | do | Hydrogen | do | 19 |
| 222 | do | do | i-Butyl | 18 |
| 223 | do | do | s-Butyl | 18 |
| 224 | do | do | n-Propyl | 20 |
| 225 | do | do | i-Propyl | 14 |
| 226 | do | do | Methyl | 8 |
| 227 | do | | Pentamethylene | 19 |
| 228 | do | | 2-me-pentamethylene | 18 |

In addition to the pre-emergence herbicidal activity indicated by the above table, the compounds of the present invention also exhibited excellent post-emergence herbicidal activity.

We claim:

1. The method of controlling the growth of weeds comprising applying to a weed habitat a phytotoxic amount of compounds of the formula

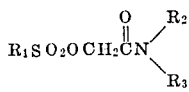

wherein R₁ is selected from the group consisting of alkyl having one to twelve carbon atoms, inclusive, lower alkenyl, halo lower alkenyl, haloalkyl having one to twelve carbon atoms, thiophene, phenyl lower alkyl, naphthyl, phenyl, and substituted phenyl wherein the substituents are selected from the group consisting of halogen, alkyl containing up to twelve carbon atoms and nitro; and R₂ and R₃ are independently selected from the group consisting of hydrogen, alkyl having up to 8 carbon atoms, lower alkenyl, cyclic alkyl, cyclic alkenyl, phenyl, phenyl lower alkyl, furfuryl, lower alkoxyalkyl and cyclic alkyl ethers.

2. The method as stated in claim 1, wherein R₁ is methyl and R₂ and R₃ are allyl.

3. The method as stated in claim 1, wherein R₁ is isobutyl and R₂ and R₃ are allyl.

4. The method as stated in claim 1, wherein R₁ is isobutyl and R₂ and R₃ taken together are 2-ethyl-pentamethylene.

5. The method as stated in claim 1, wherein R₁ is isobutyl, R₂ is hydrogen and R₃ is sec-butyl.

6. The method as stated in claim 1, wherein R₁ is isobutyl, R₂ is hydrogen and R₃ is n-propyl.

7. The method as stated in claim 1, wherein R₁ is isobutyl, R₂ is hydrogen and R₃ is isopropyl.

8. The method as stated in claim 1, wherein R₁ is isobutyl and R₂ and R₃ are n-propyl.

References Cited

UNITED STATES PATENTS 3,039,863  6/1962  Fancher et al. _____ 71—103
3,082,238  3/1963  Dunbar _____ 71—103 X JAMES O. THOMAS, JR., *Primary Examiner.*